US011087450B1

(12) United States Patent
Bitton

(10) Patent No.: US 11,087,450 B1
(45) Date of Patent: Aug. 10, 2021

(54) WHEEL MATCHER

(71) Applicant: Bitton Group Investments Inc., Richmond Hill (CA)

(72) Inventor: Michael Bitton, Vaughan (CA)

(73) Assignee: Bitton Group Investments Inc., Richmond Hill (CA)

( * ) Notice: Subject to any disclaimer, the term of this patent is extended or adjusted under 35 U.S.C. 154(b) by 0 days.

(21) Appl. No.: 17/192,957

(22) Filed: Mar. 5, 2021

(51) Int. Cl.
*G06K 9/00* (2006.01)
*G06T 7/00* (2017.01)
(Continued)

(52) U.S. Cl.
CPC .......... *G06T 7/0004* (2013.01); *G06F 16/55* (2019.01); *G06F 16/56* (2019.01); *G06K 9/6215* (2013.01); *G06K 9/6251* (2013.01); *G06K 9/6256* (2013.01); *G06K 9/6269* (2013.01); *G06N 20/00* (2019.01); *G06Q 30/0206* (2013.01); *G06T 7/13* (2017.01); *G06T 2207/20081* (2013.01); *G06T 2207/30136* (2013.01)

(58) Field of Classification Search
CPC .......... G06N 7/005; G06N 20/00; G06N 5/02; G06N 5/046; G06N 5/047; G06N 7/02; G06N 7/023; G06N 3/0454; G06N 3/08; G06N 3/0427; G06N 3/0436; G06N 3/0445; G06N 5/003; G06N 5/022; G06N 3/006; G05B 13/0275; G06F 16/90344; G06F 40/253; G06F 40/40; G06F 3/0219; G06F 3/0233; G06F 3/0237; G06F 3/0238; G06F 40/268; G06F 40/30; G06F 16/43; G06F 16/953; G06K 9/4609; G06K 9/52; G06K 9/6267; G06K 9/00832; G06K 9/00624; G06K 9/627; G06K 2209/23; G06K 7/10722; G06K 7/1417; G06K 9/00362; G06K 9/00791; G06K 9/00838; G06K 9/00885; G06K 9/00892; G06K 9/4628; G06K 2209/15
See application file for complete search history.

(56) References Cited

U.S. PATENT DOCUMENTS

2020/0167838 A1 * 5/2020 Wasiutinski ............ G06F 9/451

OTHER PUBLICATIONS

Kazmi "An Efficient Industrial System for Vehicle Tyre (Tire) Detection and Text Recognition Using Deep Learning," Feb. 2021, IEEE (Year: 2021).*

(Continued)

*Primary Examiner* — Alex Kok S Liew

(57) ABSTRACT

Disclosed herein are systems and methods for selecting re-usable car wheels, comprising, receiving one or more images of an evaluated used car wheel, transforming one or more of the images to multi-dimension feature vectors, mapping the evaluated used car wheel to one of a plurality of used car wheels by applying one or more trained ML models to classify the multi-dimension feature vector. The one or more trained ML models are trained using a plurality of multi-dimension feature vectors each created based on a plurality of images of a plurality of used car wheels, computing a price value of the mapped used car wheel based on a plurality of sale transactions of used car wheels such as the mapped used car wheel, and generating instructions to indicate whether the evaluated used car wheel is re-usable or not based on comparison between the computed price value and a price threshold.

19 Claims, 6 Drawing Sheets

(51) Int. Cl.
*G06T 7/13* (2017.01)
*G06K 9/62* (2006.01)
*G06F 16/56* (2019.01)
*G06F 16/55* (2019.01)
*G06Q 30/02* (2012.01)
*G06N 20/00* (2019.01)

(56) References Cited

OTHER PUBLICATIONS

Rychlik "Non-invasive method of car wheel rim examination" 2018, Proceedings of SPIE (Year: 2018).*

* cited by examiner

WHEEL MATCHER

FIELD AND BACKGROUND OF THE INVENTION

The present invention, in some embodiments thereof, relates to selecting re-usable used car wheels, and, more specifically, but not exclusively, to selecting re-usable used car wheels based on classification of the car wheels by Machine Learning (ML) models and comparison with dynamically updated wheel prices.

Car wheels are an essential part of a motor vehicle and is therefore a major element in the automotive industry. The automotive wheel which is configured be installed with a tire comprises a rim, spoke, and hub.

Whilst many auto part, for example, sheet metal parts, electronic components and/or systems, mechanical assemblies and/or the like may be rarely re-used, car wheels may be highly re-usable since they are completely separate from the car, may fit a wide variety of vehicles and may be easily removed and installed.

The global automotive wheel market was valued at $30,011.3 million in 2017, and is projected to reach $47,355.3 million by 2025.

The huge market opportunities combined with the high feasibility and ease of re-using used wheels may therefore promote high motivation for re-using used car wheels.

SUMMARY OF THE INVENTION

According to a first aspect of the present invention there is provided a method of selecting re-usable car wheels, comprising using one or more processors for:

Receiving one or more images of an evaluated used car wheel.

Transforming one or more of the images to multi-dimension feature vectors.

Mapping the evaluated used car wheel to one of a plurality of used car wheels by applying one or more trained ML models to classify the multi-dimension feature vector. The one or more trained ML models are trained using a plurality of multi-dimension feature vectors each created based on a plurality of images of a plurality of used car wheels.

Computing a price value of the mapped used car wheel based on a plurality of sale transactions of used car wheels such as the mapped used car wheel.

Generating instructions to indicate whether the evaluated used car wheel is re-usable or not based on comparison between the computed price value and a price threshold.

According to a second aspect of the present invention there is provided a system for selecting re-usable car wheels, comprising one or more processors configured to execute a code, the code comprising:

Code instructions to receive one or more images of an evaluated used car wheel.

Code instructions to transform the one or more images to multi-dimension feature vectors.

Code instructions to map the evaluated used car wheel to one of a plurality of used car wheels by applying one or more trained ML models to classify the multi-dimension feature vector. The one or more trained ML models are trained using a plurality of multi-dimension feature vectors each created based on a plurality of images of a plurality of used car wheels.

Code instructions to compute a price value of the mapped used car wheel based on a plurality of recent sale transactions of used car wheels such as the mapped used car wheel.

Code instructions to generate instructions to indicate whether the evaluated used car wheel is re-usable or not based on comparison between the computed price value and a price threshold.

According to a third aspect of the present invention there is provided a method of training one or more Machine Learning (ML) models for identifying re-usable car wheels, comprising using one or more processors for:

Obtaining a plurality of images of a plurality of used car wheels.

Applying one or more edge detection algorithms to each of the plurality of images to create a plurality of edge images each for a respective image.

Applying projective transformation to each of the plurality of edge images to co-center a plurality of ellipses identified in the respective edge image.

Applying one or more Laplacian operators to a grayscale gradient image of each transformed edge image to create a grayscale image of the respective image.

Transforming each of the grayscale images to a respective one of a plurality of multi-dimension feature vectors each associated with one of the plurality of used car wheels.

Training one or more ML models to classify each of the plurality of multi-dimension feature vectors to a respective one of the plurality of used car wheels.

Outputting the one or more ML models for mapping one or more evaluated used car wheels to one of the plurality of used car wheels by classifying one or more multi-dimension feature vectors extracted from one or more images of the one or more evaluated used car wheels.

According to a fourth aspect of the present invention there is provided a system for training one or more Machine Learning (ML) models for identifying re-usable car wheels, comprising one or more processors configured for executing a code, the code comprising:

Code instructions to obtain a plurality of images of a plurality of used car wheels.

Code instructions to apply one or more edge detection algorithms to each of the plurality of images to create a plurality of edge images each for a respective image.

Code instructions to apply projective transformation to each of the plurality of edge images to concenter a plurality of ellipses identified in the respective edge image.

Code instructions to apply one or more Laplacian operators to a grayscale gradient image of each transformed edge image to create a grayscale image of the respective image.

Code instructions to transform each of the grayscale images to a respective one of a plurality of multi-dimension feature vectors each associated with one of the plurality of used car wheels.

Code instructions to train one or more ML models to classify each of the plurality of multi-dimension feature vectors to a respective one of the plurality of used car wheels.

Code instructions to output the one or more ML models for mapping one or more evaluated used car wheels to one of the plurality of used car wheels by classifying one or more multi-dimension feature vectors extracted from one or more images of the one or more evaluated used car wheels.

In a further implementation form of the first and/or second aspects, the price value of the mapped used car wheel is computed based on one or more of a plurality of sale attributes of each of the plurality of sale transactions, the plurality of sale attributes comprising: an advertised condition, a sale price value and a geographical location.

In a further implementation form of the first and/or second aspects, the plurality of images used for training the one or more ML models are obtained from one or more databases logging the plurality of sale transactions of the plurality of used car wheels. The one or more databases associate each of the plurality of used car wheels with a respective one of a plurality of records comprising one or more images of the respective used car wheel and at least some of a plurality of wheel attributes of the respective used car wheel. The plurality of wheel attributes comprising: a model, a manufacturer, a year, a part number, a length, a width, a height, a diameter, a material, a structure, a color, a universal product code (UPC), an offset, a bolt pattern and/or a number of bolts.

In an optional implementation form of the first and/or second aspects, the following is done:
  Determining whether the evaluated used car wheel is damaged.
  Estimating a repair cost of the damaged evaluated used car wheel.
  Adjusting the price value computed for the damaged evaluated used car wheel according to the repair cost.

In a further implementation form of the first and/or second aspects, the multi-dimension feature vector is created from a grayscale image derived from the one or more images.

In a further implementation form of the first and/or second aspects, the grayscale image is created by applying one or more Laplacian operators to a grayscale gradient image derived the one or more images.

In a further implementation form of the first and/or second aspects, the grayscale gradient image is created by converting a transformed edge image version of the one or more images created by applying projective transformation to an edge image version created by applying one or more edge detector algorithms to the one or more image. The projective transformation is applied to co-center a plurality of ellipses identified in the edge image version.

In a further implementation form of the first, second, third and/or fourth aspects, the one or more edge detector algorithms comprise a Canny edge detection algorithm.

In a further implementation form of the first and/or second aspects, the one or more ML models are trained using a plurality of multi-dimension feature vectors created from a plurality of images of the plurality of used car wheels.

In a further implementation form of the first, second, third and/or fourth aspects, the one or more ML models are members of a group consisting of: a random forest classifier, a gradient boost based classifier and/or a Convolutional Neural Network (CNN).

In an optional implementation form of the first and/or second aspects, instructions are generated to operate one or more grabbing elements to pick the evaluated used car wheel from a conveyor belt carrying the evaluated used car wheel in case the evaluated used car wheel is determined as re-usable.

In an optional implementation form of the third and/or fourth aspects, the grayscale gradient image of each transformed edge image is created from a resized transformed edge image of the respective image.

In an optional implementation form of the third and/or fourth aspects, each of one or more of the plurality of images are transformed to multiple multi-dimension feature vectors each transformed from a respective one of a plurality of grayscale image variations. Each of the plurality of grayscale image variations is created by randomly rotating a view angle of a respective one of the one or more images.

In an optional implementation form of the third and/or fourth aspects, one or more of the ML models are trained using a training dataset comprising a first subset of the plurality of images of the plurality of used car wheels and tested using a testing dataset comprising second subset of the plurality of images of the plurality of used car wheels different from the first subset.

In an optional implementation form of the third and/or fourth aspects, one or more ML models are trained to identify one or more conditions of one or more of the plurality of used car wheels. The one or more conditions are members of a group consisting of: a defect, a damage and/or wearing.

In a further implementation form of the third and/or fourth aspects, the plurality of images are obtained from one or more databases logging a plurality of sale transactions of the plurality of used car wheels. The one or more databases associates each of the plurality of used car wheels with a respective one of a plurality of records comprising one or more images of the respective used car wheel and at least some of a plurality of wheel attributes of the respective used car wheel. The plurality of wheel attributes comprising: a model, a manufacturer, a year, a part number, a length, a width, a height, a diameter, a material, a structure, a color, a universal product code (UPC), an offset, a bolt pattern, a number of bolts, a price, an advertised condition and/or a geographical location.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have to the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
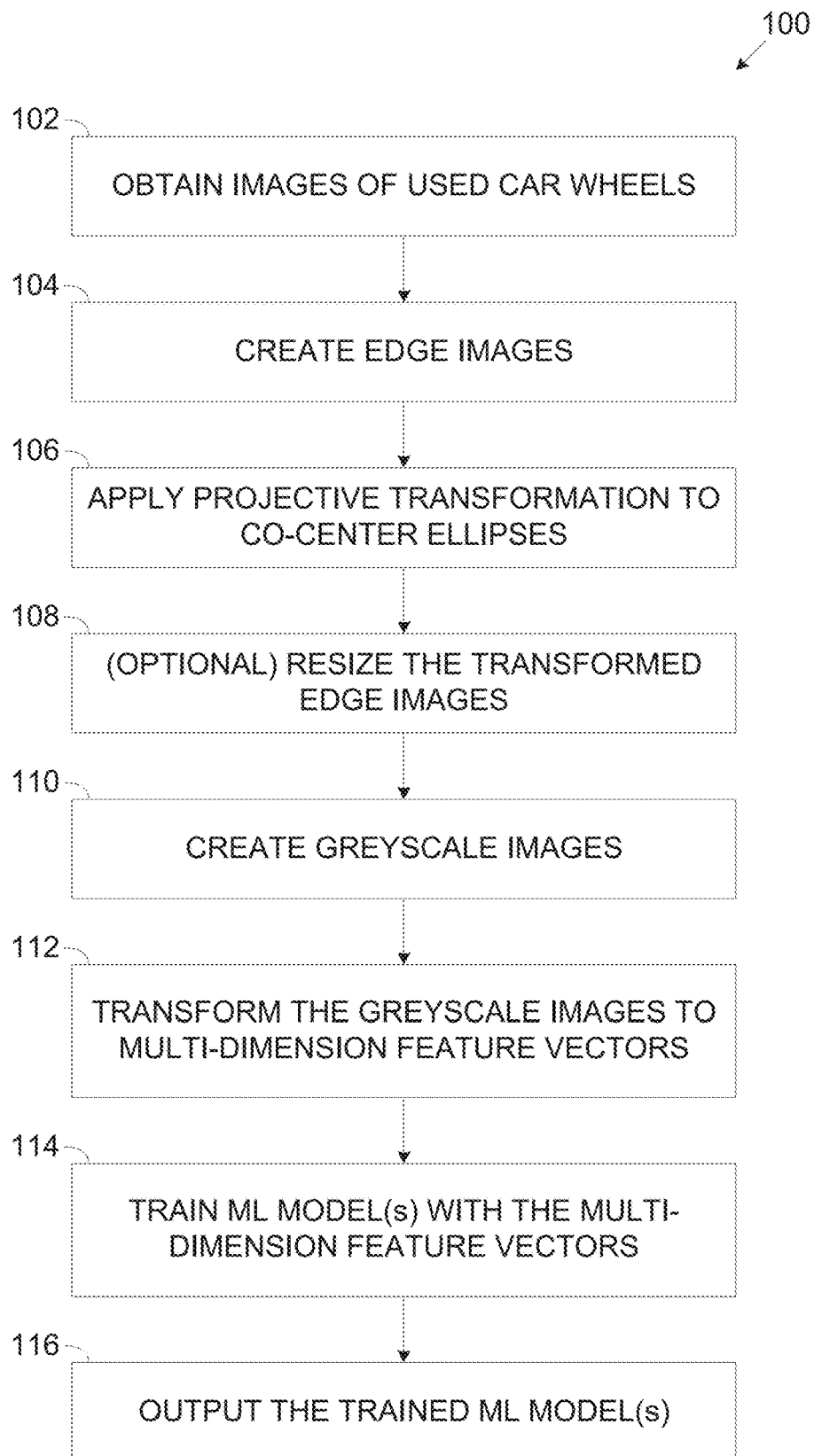
FIG. 1 is a flowchart of an exemplary process of training a Machine Learning model to classify used car wheels, according to some embodiments of the present invention.

The present invention, in some embodiments thereof, relates to selecting re-usable used car wheels, and, more specifically, but not exclusively, to selecting re-usable used car wheels based on classification of the car wheels by ML models and comparison with dynamically updated wheel prices.

According to some embodiments of the present invention, there are provided methods, systems and computer program products for selecting automatically re-usable used car wheels (rims).

Each evaluated used car wheel may be first mapped to one of a plurality of (known) car wheels using one or more trained ML models, for example, a random forest classifier, a gradient boost based classifier a Convolutional Neural Network (CNN) which may optionally include deep learning neural networks, for example, a Feed-Forward (FF) neural network, a Recurrent Neural Network (RNN) and/or the like such as, for example, ResNet50 and/or the like.

The ML model(s) may be trained to classify used car wheels using a plurality of training samples comprising a plurality of images of car wheels which may optionally include images of used car wheels and are labeled accordingly. In particular, the training images may be transformed into multi-dimension feature vectors comprising a plurality of features extracted from the images. The images may be first converted to respective edge images which may be further manipulated to crate respective grayscale images which may emphasize and accentuate the features of the car wheels depicted in the original images. This may significantly enhance the multi-dimension feature vectors extracted from the grayscale images.

The trained ML model(s) may be applied to map each of one or more evaluated used car wheels to one of the (known) learned car wheels. This may be done by first transforming one or more images of the evaluated used car wheel to respective multi-dimension feature vector(s) and applying the trained ML model(s) to classify this multi-dimension feature vector(s) to the class, i.e., the label (etc. model, part number, manufacturer) of one of the classes learned during the training.

After successfully mapped to one of the plurality of car wheels, a price value may be computed for the evaluated used car wheel. The price value may be computed based on a plurality of sale transactions in which used car wheels such as the mapped car wheel were sold. The sale transactions may be obtained automatically from one or more online resources, for example, a car parts exchange, a car parts classified website, a car dealership website and/or the like. The sale transactions including respective sale attributes, for example, advertised conditions, sale price, geographical area and/or the like may be dynamically obtained thus reflecting an up to date, accurate and reliable pricing information for the used car wheels.

The price value computed for the evaluated used car wheel may be then compared to a price threshold to determine whether the evaluated used car wheel is re-usable, specifically to determine, based on the computed price value compared to the price threshold whether re-selling the evaluated used car wheel may be profitable.

In case the evaluated used car wheel is determined re-usable, the re-usable evaluated used car wheel may be selected for re-use, specifically for re-sale to be re-used. However, in case the evaluated used car wheel is determined to be un-reusable, the evaluated used car wheel is not selected, for example, it may be scrapped.

Automatically selecting re-usable used car wheels may present major advantages and benefits compared to currently existing methods and systems for selecting used car wheels.

First, current existing methods for selecting re-usable used car wheels may be primarily based on manual evaluation of the used car wheels to determine which of the used car wheels may be re-used. Such manual labor may be highly inefficient, non-scalable, time consuming, costly, tedious and/or error prone. In contrast, selecting re-usable used car wheels based on automatic determination of the re-usability of the evaluated used car wheels may be highly scalable, accurate and efficient for evaluating extremely large numbers of wheels while significantly reducing evaluation time, costs and/or effort.

Moreover, computing automatically the price value of the evaluated used car wheels may further reduce time, cost and/or errors in the price computation compared to manual price computation as may be done by the existing methods.

Furthermore, computing the price value of the evaluated used car wheels based on up to date market information reflected by the plurality of used car wheel sale transactions may enable accurate, realistic and/or reliable price estimation of the evaluated used car wheels to select only such used car wheels which may yield profits thus significantly improve accuracy of the selection of re-usable used car wheels which in turn may significantly increase profitability.

In addition, using the ML model(s) trained to identify damaged, defect and/or worn used car wheels may further increase the accuracy in determining which of the used car wheels is re-usable in terms of re-sale profit since the condition of the used car wheels may be accurately evaluated and the price value of the evaluated used car wheels may be adjusted accordingly to compensate for possible value drops and/or repair costs.

Finally, existing systems which may use trained ML models for identifying and classifying objects, for example, car wheels may typically train the ML models using images of the car wheels, specifically feature vectors extracted from the images as known in the art. However, training the ML model(s) using the multi-dimension feature vectors extracted from the manipulated grayscale images derived from the original images of the car wheels as described in the present invention may significantly improve performance of the trained ML model(s), for example, accuracy, reliability, robustness and/or the like compared to the existing methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be to downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of training a Machine Learning model to classify used car wheels, according to some embodiments of the present invention.

An exemplary process 100 may be executed for training one or more ML models to identify car wheels, in particular used car wheels. Specifically, the process 100 may be executed to train the ML model(s) to classify the used car wheels to classes of known car wheels manufactured by one or more car wheel manufacturers.

The ML model(s) may be trained in one or more supervised training sessions using one or more datasets comprising a plurality of images of used car wheels which are labeled according to one or more car wheel attributes, specifically a model, a manufacturer and/or the like.

Figure 2:
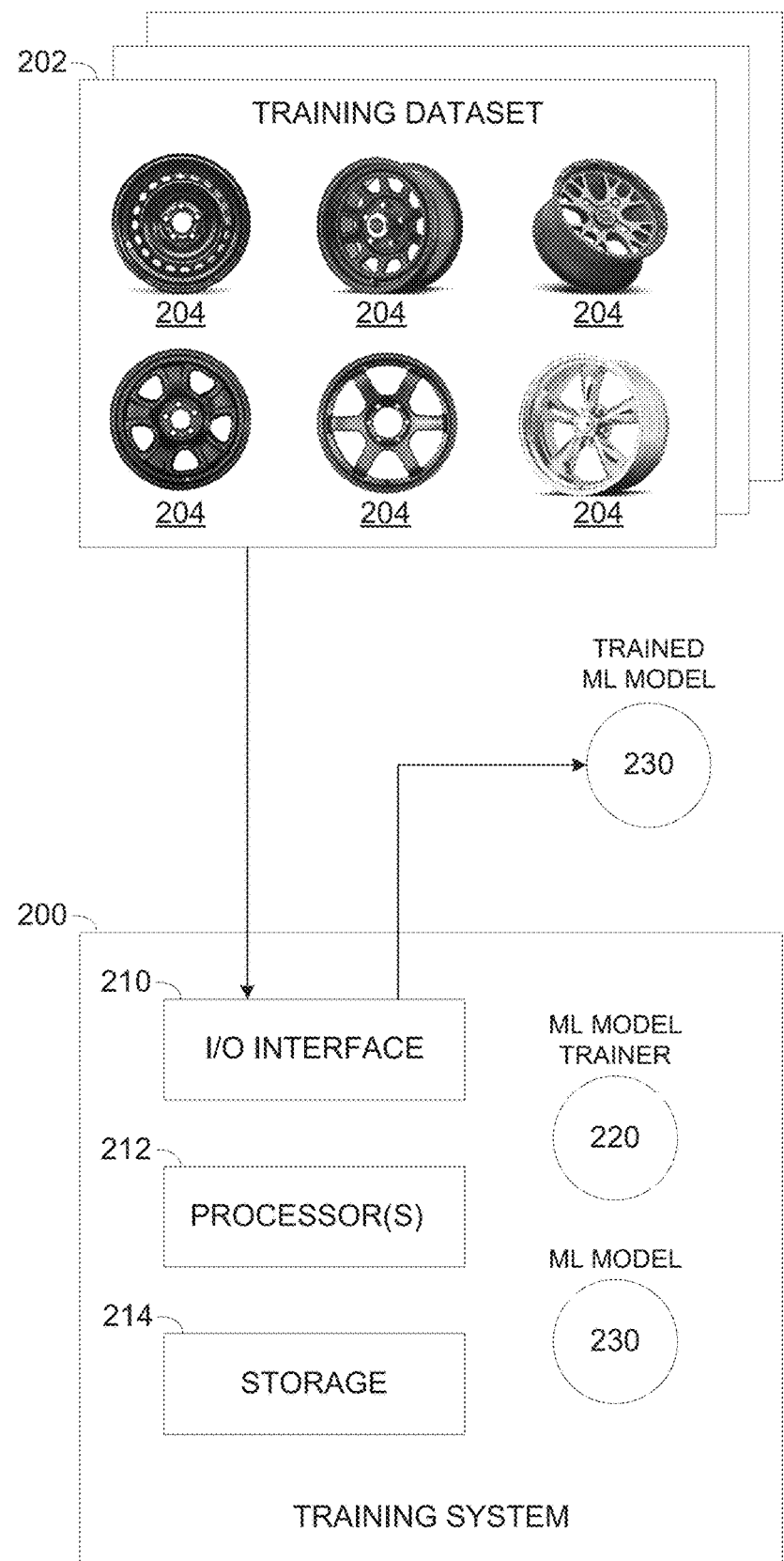
FIG. 2 is a schematic illustration of an exemplary system for training a Machine Learning model to classify used car wheels, according to some embodiments of the present invention.

Reference is also made to FIG. 2, which is a schematic illustration of an exemplary system for training a Machine Learning model to classify used car wheels, according to some embodiments of the present invention.

An exemplary training system 200, for example, a computer, a server, a processing node, a cluster of computing nodes and/or the like may be configured to execute a process such as the process 100 for training one or one or more ML models 230, for example, a neural network, a Support Vector Machine (SVM) and/or the like to identify and classify used car wheels.

The neural network(s) ML model(s) 230 may employ one or more neural network architectures, for example, a random forest classifier, a gradient boost based classifier a CNN and/or the like. One or more of the neural network(s) may further employ one or more deep learning neural network architectures, for example, a FF neural network, an RNN and/or the like as known in the art such as, for example, ResNet50 and/or the like.

The ML model(s) 230 may be trained using one or more datasets 202 comprising a plurality of images 204 of car wheels, in particular, images 204 of used car wheels.

The training system 200 may include an Input/Output (I/O) interface 210, a processor(s) 212 for executing the process 100 and storage 214 for storing code (program store) and/or data.

The I/O interface 210 may include one or more wired and/or wireless network interfaces for connecting to one or more networks, for example, a Local Area Network (LAN), a Wide Area Network (WAN), a Metropolitan Area Network (MAN), a cellular network, the internet and/or the like. The I/O interface 210 may further include one or more wired and/or wireless interconnection interfaces, for example, a Universal Serial Bus (USB) interface, a serial port, a Controller Area Network (CAN) bus interface, a Radio Frequency (RF) interface and/or the like.

Via the I/O interface 210, the training system 200 may obtain, for example, fetch, receive, acquire and/or the like one or more of the dataset(s) 202 of the used car wheels' images 204. For example, the training system 200 may connect to one or more of the networks, through the network interface(s) of the I/O interface 210, to communicate with one or more networked resources storing one or more of the images 204. In another example, the training system 200 may access one or more attachable devices attached to interconnection interface(s) available in the I/O interface 210, for example, a USB storage device storing, capturing and/or recording one or more of the images 204 and/or the like.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may optionally, integrate, utilize and/or facilitate one or more hardware elements (modules) integrated and/or utilized in the training system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof. For example, the processor(s) 212 may execute an ML trainer 220 functional module for executing the process 100 to train one or more of the ML models 230 functional modules.

Optionally, the training system 200, specifically the ML trainer 220 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like.

As shown at 102, the process 100 starts with the ML model trainer 220 obtaining (e.g. receive, fetch, acquire, etc.) one or more datasets 202 each comprising a plurality of images 204 of car wheels optionally including images 204 of used car wheels.

The ML model trainer 220 may obtain the images 204 from one or more sources. For example, the training system 200 may connect to one or more of the networks through the network interface(s) available in the I/O interface 210. In such case, the ML model trainer 220 may communicate, via the network(s), with one or more networked resources, for example, a database, a cloud imagery service, a car wheel manufacturer website and/or the like to obtain one or more of the images 204. In another example, one or more attachable devices storing one or more of the images 204 may be attached to the training system 200 via one or more interconnection interfaces of the I/O interface 210, for example, a USB storage device and/or the like. In such case, the ML model trainer 220 may access the attached attachable device(s) to obtain one or more of the images 204. In another example, the training system 200 may connect to one or more imaging sensors, for example, a camera, a video camera, an Infrared camera and/or the like connected to one or more interfaces of the I/O interface 210, for example, a network connected (e.g., LAN) imaging sensor, a WLAN (e.g., Wi-Fi) imaging sensor, a USB connected imaging sensor and/or the like. In such case, the ML model trainer 220 may communicate with the connected imaging sensor(s) to obtain one or more of the images 204 stored and/or captured by the imaging sensor(s).

The images 204 depicting the plurality of car wheels, optionally including used car wheels, may further include multiple images of each of one or more of the car wheels captured with different imaging parameters and/or conditions, for example, different view angles, different lighting conditions, different resolutions and/or the like.

Each of the images 204 may labeled (associated) with one or more wheel attributes of the respective car wheel depicted by the respective image. The wheel attributes may include, for example, a model, a manufacturer, a year, a part number, a length, a width, a height, a diameter, a material, a structure, a color, a universal product code (UPC), an offset, a bolt pattern, a number of bolts and/or the like. The listed wheel attributes should not be construed as limiting since the wheel attributes may further include additional attributes, parameters and/or characteristics as known in the art.

As shown at 104, the ML model trainer 220 may create an edge image for each of the images 204. In other words, the ML model trainer 220 may create an edge image version for each of the images 204 of the training datasets 202. The ML model trainer 220 create the edge images by applying to the images 204 one or more edge detector algorithms as known in the art, for example, Canny edge detector, thresholding and linking, edge thinning, differential edge detection and/or the like.

Specifically, the edge detector algorithms applied by the ML model trainer 220 may be a multi-stage algorithm configured to detect a wide range of edges in each of the images 204.

As shown at 106, the ML model trainer 220 may apply one or more projective transformations to each of the edge images in order to co-center a plurality of ellipses identified in the respective edge image. The projective transformation(s) which may map the edges identified in each of the edge images to one or more geometric spaces are applied to formalize the edge images such that all of the ellipses identified in each edge image become as concentric as possible.

As shown at 108, which is an optional step, the ML model trainer 220 may optionally resize the transformed edge images I order to reduce their size. The ML model 220 may use one or more techniques to resize the edge images, for example, crop, zoom, rescale and/or the like. However, while resizing the edge images, the ML model trainer 220 may preserve proportions of the edge images. For example, the ML model trainer 220 may crop each of the edge images to 64×64 pixel images.

As shown at 110, the ML model trainer 220 may create a plurality of grayscale images based on the plurality of transformed edge images, optionally after resized. This means that the ML model trainer 220 may create a respective grayscale image for each of the transformed edge images.

The ML model trainer 220 may first convert each of the transformed edge images to a respective one of a plurality of grayscale gradient images using one or more techniques, algorithms, filters and/or the like as known in the art. The ML model trainer 220 may then apply one or more Laplacian Operators to each of the grayscale gradient images in order to highlight gray level discontinuities in the respective grayscale gradient image in attempt to deemphasize regions with slowly varying gray levels. The resulting greyscale images may have grayish edge lines and other discontinuities on a dark background which accentuates and highlights the unique attributes of each used car wheel depicted in the respective image 204.

Optionally, multiple grayscale image variations are created for each of one or more of the plurality of images 204 depicting one or more of the used car wheels. The ML model trainer 220 may rotate the view angle of the respective image 204 and then apply steps 104, 106, 110 and optionally 108 to create the multiple grayscale image variations for the respective image 204. Specifically, the ML model trainer 220 may create an edge image for each of the rotated images, apply projective transformation to each of the rotated edge images and create a rotated grayscale image based on each transformed rotated edge image by applying the Laplacian operator(s) to a rotated grayscale gradient image created based on the transformed rotated edge image.

The number of grayscale image variations created for one or more of the images 204 may vary and may optionally depend on the number of overall images 204 available for the plurality of used car wheels, the number of images 204 available for each of one or more of the used car wheels, the view angles of the images 204 available for each of one or more of the used car wheels and/or the like. The number of grayscale image variations may be set to, for example, 8, 12, 16, 24 and/or the like.

As shown at 112, the ML model trainer 220 may transform each of the grayscale images to a respective one of a plurality of multi-dimension feature vectors.

Each of the multi-dimension feature vectors may include a plurality of features, for example, 512 and/or the like extracted from a respective grayscale image as known in the art and may represent a pixel, an object, a color component, a length, an area, a circularity, a gradient magnitude, a gradient direction, a gray-level intensity value and/or the like. One or more of the features of one or more of the multi-dimension feature vectors may directly relate to elements and/or pixels of the respective grayscale image. However, one or more of the multi-dimension feature vectors may include one or more features which may result from one or more manipulations applied to the respective grayscale image, for example, image processing, a computer vision technique, a transformation and/or the like.

Since each of the multi-dimension feature vectors is derived from a respective one of the plurality of images 204 depicting the plurality of used car wheels each multi-dimension feature vector is associated with one of the plurality of used car wheels. The ML model trainer 220 may therefore label each multi-dimension feature vector with the label of the image 204 from which the respective multi-dimension feature vector is derived. As described herein before, the label may include one or more of the wheel attributes of the associated used car wheel, specifically a model, a manufacturer, a part number and/or the like.

As shown at 114, the ML model trainer 220 may train one or more of the ML models 230 in one or more training sessions using the plurality of multi-dimension feature vectors associated with the plurality of used car wheels and labeled accordingly.

During the training session(s), the ML model(s) 230 may classify each of the plurality of multi-dimension feature vectors and may adjust its internal structure, weights and/or propagation paths as known in the art according to the labels of the multi-dimension feature vectors to optimize the identification, recognition and/or classification of the multi-dimension feature vectors.

Specifically, the ML model(s) 230 may compute a classification score (confidence score) for each classified (identified) multi-dimension feature vector indicative of confidence of correct classification. The classification score may be further analyzed to determine classification performance of the ML model(s) 230, for example, accuracy, reliability, robustness and/or the like.

Optionally, the ML model trainer 220 may train the ML model(s) 230 using two different subsets of the training dataset(s) 202, in particular, two subsets of the plurality of multi-dimension feature vectors created based on the images 204 of the training dataset(s) 202. The two subsets, i.e., a first subset and a second subset may include different multi-dimension feature vectors and are therefore separate and different from each other. The ML model trainer 220 may use a first subset of the multi-dimension feature vectors for training the ML model(s) 230 and a second subset of the multi-dimension feature vectors for testing the trained ML model(s) 230. Using the separate subsets for training and testing may significantly reduce and potentially prevent overfitting of the ML model(s) 230 since the ML model(s) 230 are tested with multi-dimension feature vectors which they were not trained with.

The number of multi-dimension feature vectors allocated to each of the subsets may be done as known in the art, for example, 4/5 of the multi-dimension feature vectors may be included in the first subset used for training the ML model(s) 230 while the remaining 1/5 of the multi-dimension feature vectors may be included in the second subset for testing the ML model(s) 230.

Optionally, the ML model(s) 230 may be further trained to identify one or more conditions of the one or more of the used car wheels, for example, damage, defect, wearing and/or the like and classify the respective used car wheel as a damaged used car wheel, a worn used car wheel, a defective used car wheel and/or the like. To this end, the ML model trainer 220 may obtain images 204 depicting one or more of the used car wheels having one or more defects, damage marks, wearing marks and/or the like. The ML model(s) 230 trained to identify the used car wheels' conditions may therefore further output, in addition to the label and the classification score, a condition score and/or description indicative of the conditions identified for one or more of the used car wheels, specifically in each of the classified multi-dimension feature vectors associated with the respective used car wheel.

As shown at 116, the ML model trainer 220 may output the trained ML model(s) 230. For example, the ML model trainer 220 may transmit the trained ML model(s) 230 to one or more remote networked resources, for example, a system, a service, a platform and/or the like via one or more networks connected to the I/O interface 210. In another example, the ML model trainer 220 may store the trained ML model(s) 230 in one or more of the attachable storage devices attached to the I/O interface 210. The attachable storage device(s) may be then attached to one or more other systems, a services, a platforms and/or the like which may use the trained ML model(s) 230. In another example, the ML model trainer 220 may locally store the trained ML model(s) 230, for example, in the storage 214 for future use.

The trained ML model(s) 230 may be thus used for mapping one or more evaluated used car wheels to one of the plurality of used car wheels. In particular, the ML model(s) 230 may be applied to classify (identify) one or more multi-dimensional feature vectors extracted from one or more images 204 of the respective evaluated used car wheel, specifically multi-dimensional feature vector(s) created based on grayscale image(s) derived from the images 204 of the respective evaluated used car wheel as described in the process 100.

Figure 3A:
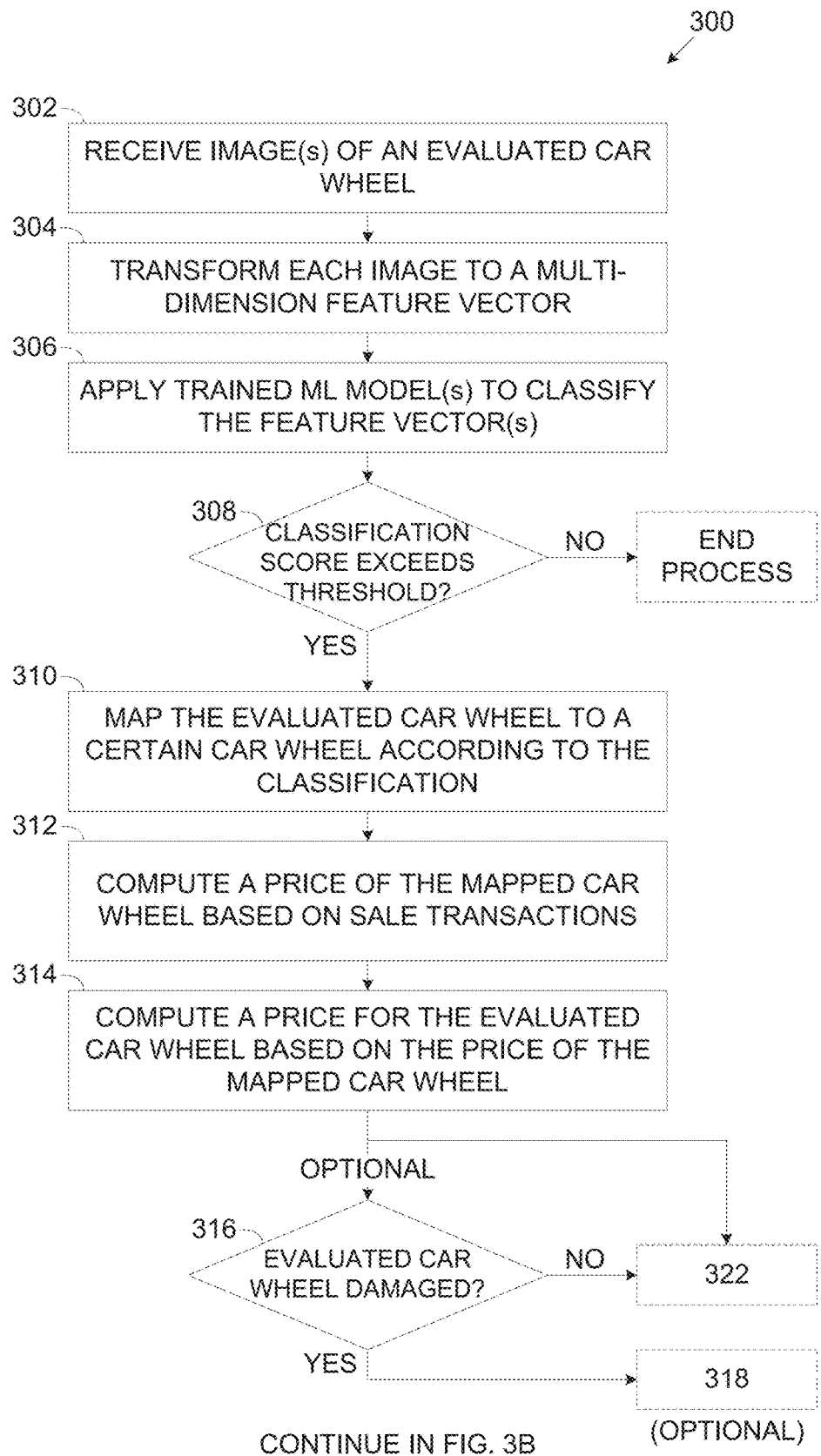
FIG. 3A and FIG. 3B present a flowchart of an exemplary process of evaluating reusability of used car wheels using trained Machine Learning model(s), according to some embodiments of the present invention.
Figure 3B:
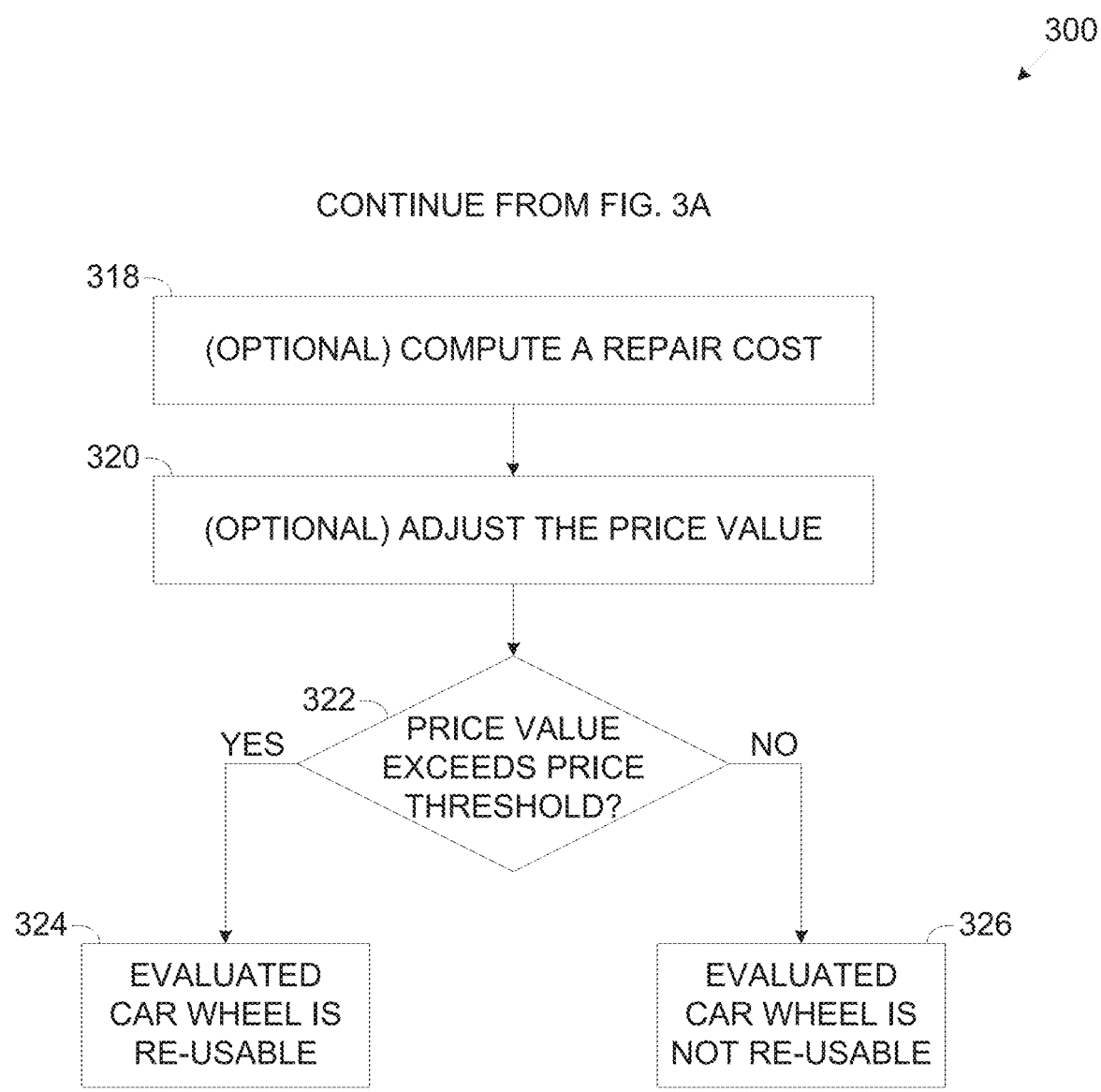
Figure 4:
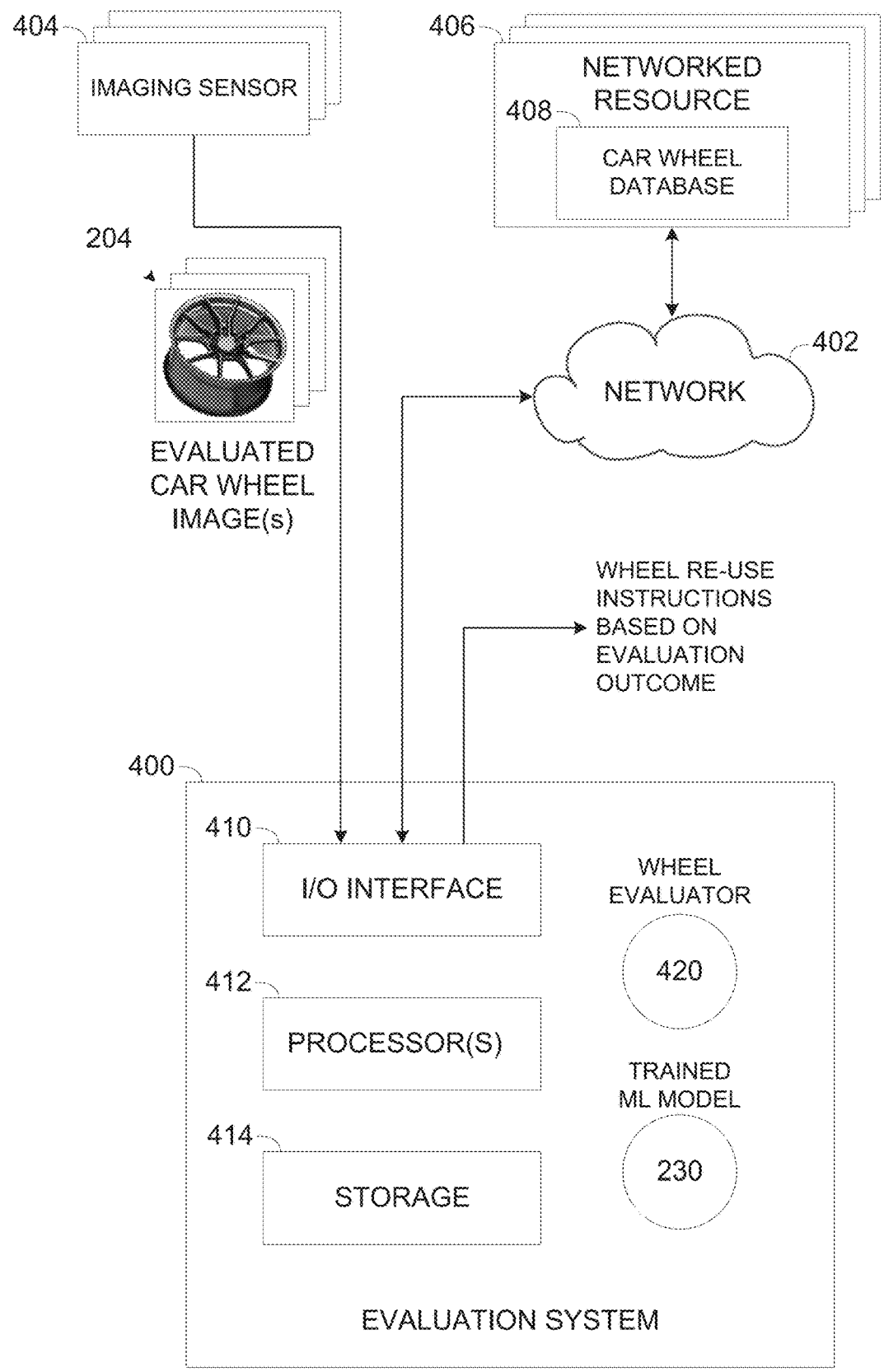
FIG. 4 is a schematic illustration of an exemplary system for evaluating reusability of used car wheels using trained Machine Learning model(s), according to some embodiments of the present invention.

Reference is now made to FIG. 3A and FIG. 3B, which present a flowchart of an exemplary process of evaluating reusability of used car wheels using trained Machine Learning model(s), according to some embodiments of the present invention. Reference is also made to FIG. 4, which is a schematic illustration of an exemplary system for evaluating reusability of used car wheels using trained Machine Learning model(s), according to some embodiments of the present invention.

An evaluation system 400, for example, a computer, a server, a processing node, a cluster of computing nodes and/or the like may execute an exemplary process 300 for selecting re-usable used car wheels using one or more trained ML models such as the ML model 230 to identify and classify the evaluated used car wheels.

The evaluation system 400 may include an I/O interface 410 such as the I/O interface 210, a processor(s) 412 such as the processor(s) 212 for executing the process 300 and storage 414 such as the storage 214 for storing code (program store) and/or data.

Via the I/O interface 410, the evaluation system 400 may connect to a network 402 comprising one or more wired and/or wireless networks, for example, a LAN, a WAN, a MAN, a cellular network, the internet and/or the like and communicate with one or more networked resources 406.

For example, the evaluation system 400 may communicate with one or more networked resources 406 maintaining, controlling and/or storing one or more databases, specifically one or more car wheel databases 408 comprising one or more records listing a plurality of car wheels, in particular used car wheels.

The car wheel database(s) 408 may associate each of the plurality of listed car wheels with one or more wheel attributes of the respective car wheel, for example, a model, a manufacturer, a year, a part number, a length, a width, a height, a diameter, a material, a structure, a color, a universal product code (UPC), an offset, a bolt pattern, a number of bolts and/or the like. The listed wheel attributes should not be construed as limiting since the wheel attributes may further include additional attributes, parameters and/or characteristics as known in the art. The car wheel database(s) 408 may further associate each of the plurality of listed car wheels with one or more images such as the images 204 depicting the respective car wheel.

Moreover, the car wheel database(s) 408 may further list a plurality of sale transactions of at least some of the plurality of the used car wheels. Each of the sale transactions may be associated in the car wheel database(s) 408 with one or more sale attributes relating to the sale transaction in which one or more of the used car wheels are sold, for example, an advertised condition indicative of the condition of the used car wheel sold in the respective sale transaction, a sale price of the used car wheel sold in the respective sale transaction, a geographical location of the sale transaction and/or the like.

The car wheel database(s) 408 may be dynamically updated with the sale transactions, for example, continuously, periodically and/or the like. The car wheel database(s) 408 may therefore express a current and up to date market state of the used car wheels as reflected by current and/or recent sale transactions. The car wheel database(s) 408 may be updated based on information extracted from one or more online resources, for example, a car parts exchange, a car parts classified website, a car dealership website and/or the like.

Optionally, the car wheel database(s) 408 may be updated to include only most recent sale transactions, for example, sale transactions made in the past 10 years, the past 5 years, the part year and/or the like.

Via the I/O interface 410, the evaluation system 400 may further receive one or more images 204 of one or more used car wheels, in particular, used car wheels which are evaluated to determine whether they are suitable for re-use or not and may be selected accordingly. For example, via the I/O interface 410, the evaluation system 400 may to one or more imaging sensors 404, for example, a camera, a video camera, an Infrared camera, a thermal camera and/or the like. The imaging sensor(s) 404 may be configured to connect directly to one or more interfaces of the I/O interface 410, for example, a network connected (e.g., LAN, WLAN, RF, etc.) imaging sensor connected to networks accessible via the I/O interface 410, a USB connected imaging sensor connected to a USB port of the I/O interface 410 and/or the like. However, in one or more deployments, one or more of the imaging sensors 404 may be connected to one or more other hosting system connected to the network 402, for example, a computer, a server, a mobile device (e.g. tablet, Smartphone, etc.), a controller and/or the like such that the evaluation system 400 may communicate with hosting device(s) to receive the image(s) 204 of the evaluated used car wheel(s).

As described for the processor(s) 212, the processor(s) 412 may execute one or more software modules each comprising a plurality of program instructions stored in a non-transitory medium (program store) such as the storage 414 and executed by one or more processors such as the processor(s) 412. The processor(s) 412 may also optionally, integrate, utilize and/or facilitate one or more of the hardware elements (modules) integrated and/or utilized in the evaluation system 400.

The processor(s) 412 may therefore execute one or more functional modules implemented using one or more software modules, one or more of the hardware modules and/or combination thereof. For example, the processor(s) 412 may execute a wheel evaluator 420 functional module for executing the process 300 to evaluate and select one or more used car wheels which are determined re-usable based on classification by one or more of the trained ML models 230.

Optionally, the evaluation system 400, specifically the wheel evaluator 420 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like.

Moreover, the wheel evaluator 420 and/or one or more of the trained ML models 230 may be executed in a distributed deployment such that they may be executed at least partially by two separate systems. For example, the evaluation system 400 may be combined at least partially with a training system such as the training system 200 such that the combined system may execute the wheel evaluator 420 and the trained ML model(s) 230 in addition to an ML model trainer such as the ML model trainer 220 executed to train the ML model(s) 230. In another example, the evaluation system 400 may execute the wheel evaluator 420 while one or more of the ML model(s) 230 may be executed by the training system 200. In another example, the evaluation system 400 may execute the wheel evaluator 420 while one or more of the ML model(s) 230 may be executed by one or more of the cloud computing services.

For brevity, the process 300 is described herein after for a single used car wheel evaluated for selection for re-use or not. This however, should not be construed as limiting, since the process 300 may be expanded and/or repeated to evaluate and optionally select for re-use a plurality of used car wheels.

As shown at 302, the process 300 starts with the wheel evaluator 420 receiving one or more images 204 depicting an evaluated car wheel, specifically a used car wheel.

The image(s) 204 of the evaluated used car wheel may be captured by one or more of the imaging sensors 404 deployed to monitor the evaluated used car wheel. For example, one or more of the imaging sensors 404 may be deployed to monitor a conveyer belt carrying the evaluated car wheel.

As shown at 304, the wheel evaluator 420 may transform one or more of the received images 204 to respective multi-dimension feature vectors. The wheel evaluator 420 may apply the same methods, techniques and/or algorithms described in the process 100, specifically in steps 104, 106, 110, 112 and optionally step 108 to create a respective multi-dimension feature vector for each of one or more of the image(s) 204 of the evaluated used car wheel.

As shown at 306, the wheel evaluator 420 may apply one or more of the trained ML model(s) 230 to classify the multi-dimension feature vector(s) created based on the image(s) 204 of the evaluated used car wheel.

The trained ML model(s) 230 may output the label (class) associated with one of the used car wheels which the trained ML model(s) 230 determines is most probable the class of the evaluated used car wheel based on the classification of the multi-dimension feature vector(s) derived from the image(s) 204 of the evaluated used car wheel. The trained ML model(s) 230 may further output a classification score (confidence score) for the most probable class (label) indicative of the confidence of correct classification of the evaluated used car wheel to the respective class.

As shown at 308, which is a conditional step, in case the classification score computed by the trained ML model(s) 230 exceeds a certain score threshold, for example, 0.75, 0.85, 0.9 and/or the like (values in the range of 0 to 1), the process 300 may branch to step 310. However, in case the classification score does not exceed the certain score threshold, the process 300 may end since the evaluated used car wheel may not be identified with sufficient certainty.

As shown at 310, the wheel evaluator 420 may map the evaluated used car wheel to one of the plurality of used car wheels according to the classification of the trained ML model(s) 230, specifically according to the label of the class estimated by the trained ML model(s) 230 for the evaluated used car wheel.

As shown at 312, the wheel evaluator 420 may compute, for example, determine, derive, estimate and/or the like a price value of the mapped used car wheel.

In particular, the wheel evaluator 420 may compute the price value of the mapped used car wheel based on a plurality of sale transactions in which the used car wheels such as the mapped used car wheel was sold. To this end, the wheel evaluator 420 may access the car wheel database(s) 408 to fetch information relating to sale transactions of the mapped used car wheel, specifically the wheel evaluator 420 may fetch the sale attributes associated with each such sale transaction.

The wheel evaluator 420 may apply one or more methods, techniques and/or algorithms to compute the price value of the mapped used car wheel. For example, the wheel evaluator 420 may aggregate the sale price values of all sale transactions to produce, for example, an average price value of the mapped used car wheel. In another example, the wheel evaluator 420 may aggregate the sale price values of only a subset of the sale transactions, for example, a subset of most recent sale transactions to produce, for example, a recent price value of the mapped used car wheel.

The wheel evaluator 420 may further adjust the price value computed for the mapped used car wheel according to one or more of the sale attributes. For example, the wheel evaluator 420 may adjust the price value of the mapped used car wheel according to the geographical location in which the sale transactions took place. In another example, assuming the trained ML model(s) 230 are trained to identify a condition of the evaluated used car wheel, the wheel evaluator 420 may adjust the price value of the mapped used car wheel according to the advertised condition identified in one or more of the sale transactions. In particular, the wheel evaluator 420 may adjust the price value of the mapped used car wheel according to the advertised conditions with respect to the condition identified by the trained ML model(s) 230 for the evaluated used car wheel.

As shown at 314, the wheel evaluator 420 may compute, for example, determine, derive, estimate and/or the like a price value of the evaluated used car wheel based on the price value computed for the mapped used car wheel.

For example, the wheel evaluator 420 may compute the price value of the evaluated used car wheel as the price value of a used car wheels of the same class (model, part number, etc.), i.e., the mapped used car wheel sold in a most recent sale transaction. In another example, the wheel evaluator 420 may compute the price value of the evaluated used car wheel as the average price value of a used car wheels of the same class sold in a plurality of sale transactions. In another example, the wheel evaluator 420 may compute the price value of the evaluated used car wheel as the average price value of used car wheels of the same class sold in a plurality of sale transactions in the same geographical area as the evaluated used car wheel. In another example, assuming the condition of the evaluated used car wheel is identified as worn, the wheel evaluator 420 may compute the price value of the evaluated used car wheel as the price value of used car wheel(s) of the same class in similar wearing conditions sold in one or more sale transactions.

As shown at 316, which is an optional conditional step, in case the ML model(s) 230 are trained to identify a condition of the used car wheels, the wheel evaluator 420 may evaluate the condition of the evaluated used car wheel based on the outcome of the trained ML model(s) 230, specifically the wheel evaluator 420 may estimate whether the evaluated used car wheel is damaged.

In case the evaluated used car wheel is estimated as not damaged, the process 300 may branch to step 322. However, in case the evaluated used car wheel is estimated to be damaged, the process 300 may optionally branch to step 318.

As shown at 318 which is an optional step followed in case step 316 is conducted and the evaluated used car wheel is estimated to be damaged, the wheel evaluator 420 may compute a repair cost for repairing the damaged evaluated used car wheel. The wheel evaluator 420 may compute, for example, determine, derive, estimate and/or the like the repair cost based on cost of repairing one or more other used car wheels which were damaged to a similar extent as the evaluated used car wheel. The wheel evaluator 420 may obtain the repair costs of the other used car wheels from one or more of the networked resources, for example, an online repair price list for auto parts, a website of a car repair service, the car wheel database(s) 408 which may further list repair costs for damaged car wheels and/or the like.

As shown at 320 which is an optional step followed in case steps 316 and 318 are conducted, the wheel evaluator 420 may adjust the price value of the evaluated used car wheel according to the estimated repair cost.

It should be noted that in case optional steps 316, 318 and 320 are not applied to evaluate whether the evaluate used car wheel is damaged and adjust the price value computed for the evaluated used car wheel according to the repair cost, the process 300 may branch directly from step 314 to step 322.

As shown at 322, which is a conditional step, in case the price value computed for the evaluated used car wheel, optionally the adjusted price value exceeds a price threshold, the process 300 may branch to step 324. However, in case the price value exceeds does not exceed the price threshold, the process 300 may branch to step 326.

The price threshold may be defined according to one or more requirements, constraints and/or the like, for example, to ensure a certain profit margin for re-selling and re-using the evaluated used car wheel. The price threshold which may be defined per each used car wheel may be predefined, for example, manually. However, the price threshold may be dynamically and automatically adjusted according to the price value of the evaluated used car wheel as reflected in the sale price identified for a plurality of sale transactions of used car wheels of the same class as the evaluated used car wheel.

As shown at 324, in case the price value of the evaluated used car wheel exceeds the price threshold, the wheel evaluator 420 may determine that the evaluated used car wheel is suitable for re-use and may generate (compute) instructions accordingly to indicate the evaluated used car wheel is re-usable and hence selected for re-use.

As shown at 326, in case the price value of the evaluated used car wheel does not exceed the price threshold, the wheel evaluator 420 may determine that the evaluated used car wheel is not suitable for re-use and may generate (compute) instructions accordingly to indicate the evaluated used car wheel is not re-usable and hence not selected for re-use.

The instructions generated by the wheel evaluator 420 for selecting the evaluated used car wheel for re-use or not may depend on an architecture, capabilities, deployment and/or the like the like of the systems and/or methods used for selecting re-usable evaluated used car wheels.

For example, the wheel evaluator 420 may compute instructions to operate one or more indication lights (lamps), for example, a green light and a red light according to which a user may select the evaluated used car wheel. In case the wheel evaluator 420 determines that the evaluated used car wheel is re-usable, the wheel evaluator 420 may generate instructions to turn ON the green light. However, in case the wheel evaluator 420 determines that the evaluated used car wheel is not re-usable, the wheel evaluator 420 may generate instructions to turn ON the red light.

In another example, the evaluated used car wheel may be carried by a conveyer belt carrying one or more used car wheels. In such case, the wheel evaluator 420 may compute instructions to operate one or more grabbing elements configured to pick one or more of the car wheel from the conveyor belt.

Figure 5:
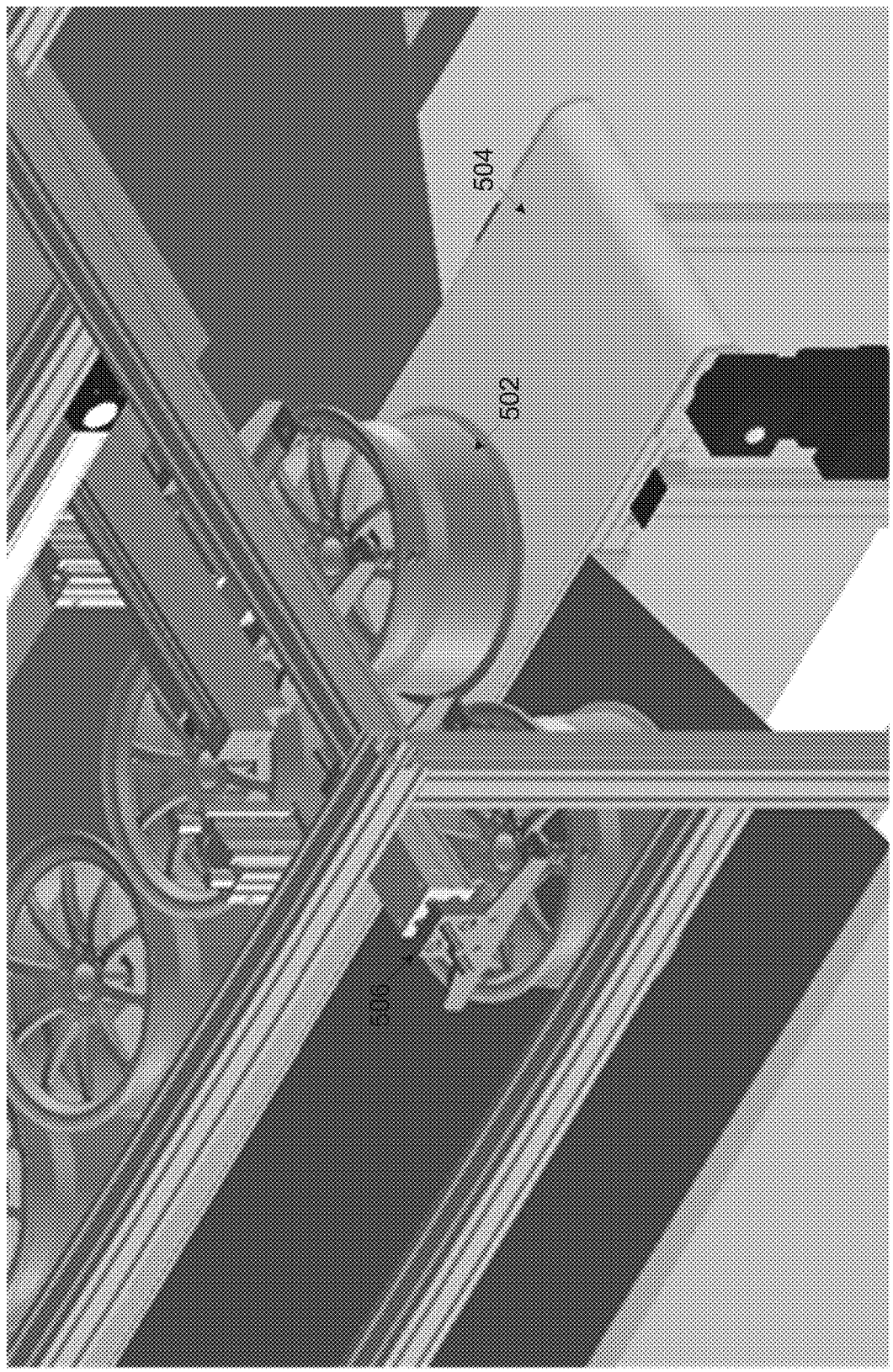
FIG. 5 is a schematic illustration of an exemplary conveyer belt carrying used car wheels and operated according to reusability of the used car wheels, according to some embodiments of the present invention.

Reference is now made to FIG. 5, which is a schematic illustration of an exemplary conveyer belt carrying used car wheels and operated according to reusability of the used car wheels, according to some embodiments of the present invention.

A conveyer belt 504 may carry a plurality of used car wheels 502 which may be evaluated by a wheel evaluator such as the wheel evaluator 420 configured to execute the process 300 for selecting re-usable used car wheels of the evaluated used car wheels 502. One or more imaging sensors such as the imaging sensor 404 deployed to monitor at least part of the conveyer belt 504 may be operated to capture one or more images depicting one or more of the plurality of used car wheels 502 moving on the conveyer belt 504. The captured images may be used by the wheel evaluator 420 executing the process 100 to select the re-usable used car wheels.

Specifically, the wheel evaluator 420 may generate (compute) instructions for operating one or more grabbing elements 506 configured to pick one or more of the used car wheels 502 from the conveyer belt 504.

For example, in case the wheel evaluator 420 determines that the evaluated used car wheel is re-usable, the wheel evaluator 420 may generate instructions to operate the grabbing element(s) 506 to pick the re-usable evaluated used car wheel 502 from the conveyer belt 504 and place it a predefined location, for example, a bin designated for re-usable used car wheels. In case the wheel evaluator 420 determines that the evaluated used car wheel 502 is not re-usable, the un-reusable evaluated used car 502 wheel may be left on the conveyer belt 504 until eventually dropped into a scrapping bin. In another example, in case the wheel evaluator 420 determines that the evaluated used car wheel 502 is not re-usable, the wheel evaluator 420 may generate instructions to operate the grabbing element(s) 506 to pick the un-reusable evaluated used car wheel 502 from the conveyer belt 504 and place it a predefined location, for example, a bin designated for scrapped used car wheels.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms machine learning models, neural networks and deep neural network architectures are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately to or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of selecting re-usable car wheels, comprising:
    using at least one processor for:
        receiving at least one image of an evaluated used car wheel;
        transforming the at least one image to a multi-dimension feature vector;
        mapping the evaluated used car wheel to one of a plurality of used car wheels by applying at least one trained ML model to classify the multi-dimension feature vector, the at least one trained ML model is trained using a plurality of multi-dimension feature vectors each created based on a plurality of images of a plurality of used car wheels;
        computing a price value of the mapped used car wheel based on a plurality of sale transactions of used car wheels such as the mapped used car wheel; and
        generating instructions to indicate whether the evaluated used car wheel is re-usable or not based on comparison between the computed price value and a price threshold.

2. The method of claim 1, wherein the price value of the mapped used car wheel is computed based on at least one of a plurality of sale attributes of each of the plurality of sale transactions, the plurality of sale attributes comprising: an advertised condition, a sale price value and a geographical location [database further lists sale transactions].

3. The method of claim 2, wherein the plurality of images used for training the at least one ML model are obtained from at least one database logging the plurality of sale transactions of the plurality of used car wheels, the at least one database associates each of the plurality of used car wheels with a respective one of a plurality of records comprising at least one image of the respective used car wheel and at least some of a plurality of wheel attributes of the respective used car wheel, the plurality of wheel attributes comprising: a model, a manufacturer, a year, a part number, a length, a width, a height, a diameter, a material, a structure, a color, a universal product code (UPC), an offset, a bolt pattern and a number of bolts [database of wheels listing their attributes and price values].

4. The method of claim 1, further comprising:
    determining whether the evaluated used car wheel is damaged,
    estimating a repair cost of the damaged evaluated used car wheel, and
    adjusting the price value computed for the damaged evaluated used car wheel according to the repair cost [evaluate usability of damaged parts].

5. The method of claim 1, wherein the multi-dimension feature vector is created from a grayscale image derived from the at least one image [creating the vector from the grayscale image].

6. The method of claim 5, wherein the grayscale image is created by applying at least one Laplacian operator to a grayscale gradient image derived from the at least one image [Laplacian operator].

7. The method of claim 6, wherein the grayscale gradient image is created by converting a transformed edge image version of the at least one image created by applying projective transformation to an edge image version created by applying at least one edge detector algorithm to the at least one image, the projective transformation is applied to co-center a plurality of ellipses identified in the edge image version [edge detection and projective transformation].

8. The method of claim 7, wherein the at least one edge detector algorithm comprises a Canny edge detection algorithm [Canny edge detector].

9. The method of claim 1, wherein the at least one ML model is trained using a plurality of multi-dimension feature vectors created from a plurality of images of the plurality of used car wheels [trained ML model].

10. The method of claim 1, wherein the at least one ML model is a member of a group consisting of: a random forest classifier, a gradient boost based classifier and a Convolutional Neural Network (CNN) [ML models types].

11. The method of claim 1, further comprising generating instructions to operate at least one grabbing element to pick the evaluated used car wheel from a conveyor belt carrying the evaluated used car wheel in case the evaluated used car wheel is determined as re-usable [conveyer belt embodiment].

12. A system for selecting re-usable car wheels, comprising:
    at least one processor configured to execute a code, the code comprising:
        code instructions to receive at least one image of an evaluated used car wheel;
        code instructions to transform the at least one image to a multi-dimension feature vector;
        code instructions to map the evaluated used car wheel to one of a plurality of used car wheels by applying at least one trained ML model to classify the multi-dimension feature vector, the at least one trained ML model is trained using a plurality of multi-dimension feature vectors each created based on a plurality of images of a plurality of used car wheels;
        code instructions to compute a price value of the mapped used car wheel based on a plurality of recent sale transactions of used car wheels such as the mapped used car wheel; and
        code instructions to generate instructions to indicate whether the evaluated used car wheel is re-usable or not based on comparison between the computed price value and a price threshold.

13. A method of training at least one Machine Learning (ML) model for identifying re-usable car wheels, comprising:
  using at least one processor for:
    obtaining a plurality of images of a plurality of used car wheels;
    applying at least one edge detection algorithm to each of the plurality of images to create a plurality of edge images each for a respective image;
    applying projective transformation to each of the plurality of edge images to co-center a plurality of ellipses identified in the respective edge image;
    applying at least one Laplacian operator to a grayscale gradient image of each transformed edge image to create a grayscale image of the respective image;
    transforming each of the grayscale images to a respective one of a plurality of multi-dimension feature vectors each associated with one of the plurality of used car wheels;
    training at least one ML model to classify each of the plurality of multi-dimension feature vectors to a respective one of the plurality of used car wheels; and
    outputting the at least one ML model for mapping at least one evaluated used car wheel to one of the plurality of used car wheels by classifying at least one multi-dimension feature vector extracted from at least one image of the at least one evaluated used car wheel.

14. The method of claim 13, further comprising the grayscale gradient image of each transformed edge image is created from a resized transformed edge image of the respective image [resizing the edge images after applied with projective transformation].

15. The method of claim 13, further comprising transforming at least one of the plurality of images to multiple multi-dimension feature vectors each transformed from a respective one of a plurality of grayscale image variations, each of the plurality of grayscale image variations is created by randomly rotating a view angle of the at least one image [multiple images per wheel (e.g. 12)].

16. The method of claim 13, further comprising training the at least one ML model using a training dataset comprising a first subset of the plurality of images of the plurality of used car wheels and tested using a testing dataset comprising second subset of the plurality of images of the plurality of used car wheels different from the first subset [separate training and testing datasets to prevent overfitting].

17. The method of claim 13, further comprising training the at least one ML model to identify at least one condition of at least one of the plurality of used car wheels, the at least one condition is a member of a group consisting of: a defect, a damage and wearing [identify conditions of the wheels].

18. The method of claim 13, wherein the plurality of images are obtained from at least one database logging a plurality of sale transactions of the plurality of used car wheels, the at least one database associates each of the plurality of used car wheels with a respective one of a plurality of records comprising at least one image of the respective used car wheel and at least some of a plurality of wheel attributes of the respective used car wheel, the plurality of wheel attributes comprising: a model, a manufacturer, a year, a part number, a length, a width, a height, a diameter, a material, a structure, a color, a universal product code (UPC), an offset, a bolt pattern, a number of bolts, a price, an advertised condition and a geographical location [database of wheels listing their attributes and price values].

19. A system for training at least one Machine Learning (ML) model for identifying re-usable car wheels, comprising:
  at least one processor configured for executing a code, the code comprising:
    code instructions to obtain a plurality of images of a plurality of used car wheels;
    code instructions to apply at least one edge detection algorithm to each of the plurality of images to create a plurality of edge images each for a respective image;
    code instructions to apply projective transformation to each of the plurality of edge images to concenter a plurality of ellipses identified in the respective edge image;
    code instructions to apply at least one Laplacian operator to a grayscale gradient image of each transformed edge image to create a grayscale image of the respective image;
    code instructions to transform each of the grayscale images to a respective one of a plurality of multi-dimension feature vectors each associated with one of the plurality of used car wheels;
    code instructions to train at least one ML model to classify each of the plurality of multi-dimension feature vectors to a respective one of the plurality of used car wheels; and
    code instructions to output the at least one ML model for mapping at least one evaluated used car wheel to one of the plurality of used car wheels by classifying at least one multi-dimension feature vector extracted from at least one image of the at least one evaluated used car wheel.

* * * * *